United States Patent
Zhou

(10) Patent No.: US 10,844,214 B2
(45) Date of Patent: Nov. 24, 2020

(54) ELASTIC PARTICLE AND PREPARATION METHOD THEREOF

(71) Applicant: Guangxi Sisland Industrial Co. Ltd, Wuzhou (CN)

(72) Inventor: Yueliu Zhou, Wuzhou (CN)

(73) Assignee: Guangxi Sisland Industrial Co. Ltd, Wuzhou (CN)

( * ) Notice: Subject to any disclaimer, the term of this patent is extended or adjusted under 35 U.S.C. 154(b) by 0 days.

(21) Appl. No.: 16/189,879

(22) Filed: Nov. 13, 2018

(65) Prior Publication Data

US 2020/0062947 A1 Feb. 27, 2020

(30) Foreign Application Priority Data

Aug. 21, 2018 (CN) .......................... 2018 1 0955295

(51) Int. Cl.
   *C08L 53/02* (2006.01)
   *C09J 153/02* (2006.01)
(52) U.S. Cl.
   CPC ........... *C08L 53/025* (2013.01); *C09J 153/02* (2013.01)
(58) Field of Classification Search
   CPC ............................... C08L 53/02; C08L 53/025
   See application file for complete search history.

(56) References Cited

U.S. PATENT DOCUMENTS 5,869,555 A * 2/1999 Simmons ................. C08J 3/124
                                                  524/229
6,191,197 B1 * 2/2001 Wang ....................... C08L 21/00
                                                  524/116

FOREIGN PATENT DOCUMENTS

| CN | 101177509 A | 5/2008 |
|---|---|---|
| CN | 101294056 A | 10/2008 |
| CN | 103524979 A | 1/2014 |
| CN | 105524474 A | 4/2016 |
| CN | 105602182 A | 5/2016 |
| CN | 107739492 A | 2/2018 |
| EP | 0943679 A1 | 9/1999 |
| JP | S 58196244 A | 11/1983 |
| WO | WO2000/060000 A1 | 10/2000 |
| WO | WO 2007/109245 A2 | 9/2007 |
| WO | WO 2008/109245 A1 | 9/2008 |
| WO | WO 2018/131619 A1 | 7/2018 |

OTHER PUBLICATIONS

International Search Report, dated May 21, 2019, for corresponding International Application No. PCT/CN2018/108224, pp. 1-5.
Written Opinion of the International Searching Authority, dated May 21, 2019, for corresponding International Application No. PCT/CN2018/108224, pp. 1-3.
China Office Action dated Dec. 4, 2019 for corresponding China application No. 201810955295.6, pp. 1-8.
Beijing Institute of Technology, "Concise Handbook of Raw Materials and Equipment for the Rubber Industry—2016 Edition", Beijing Institute of Technology Press, Nov. 1, 2016, pp. 173-175, with English abstract.

* cited by examiner

Primary Examiner — Wenwen Cai
(74) Attorney, Agent, or Firm — Intellectual Property Law Group LLP

(57) ABSTRACT

The present disclosure relates to an elastic particle and a preparation method thereof. An elastic particle is produced from raw materials including, by weight percent, 20% to 55% of styrenic block copolymer, 20% to 77% of softening oil, and 3% to 25% of liquid rubber.

15 Claims, 1 Drawing Sheet

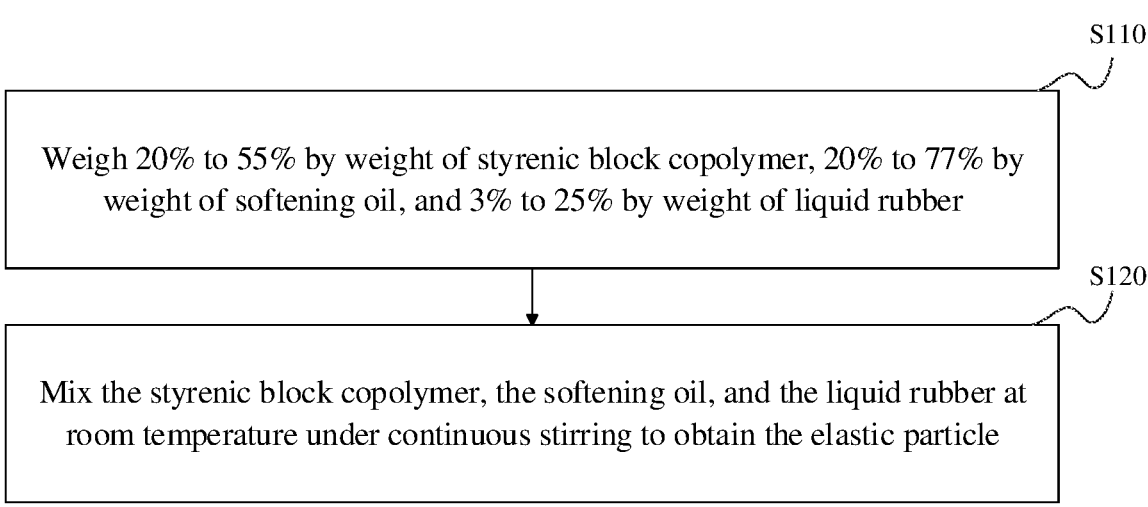

ELASTIC PARTICLE AND PREPARATION METHOD THEREOF

CROSS REFERENCE TO RELATED APPLICATIONS

This application claims priority under 35 U.S.C. § 119 to Chinese Patent Application No. 201810955295.6, filed on Aug. 21, 2018, the entire content of which is incorporated herein in its entirety.

TECHNICAL FIELD

The present disclosure relates to an elastic particle and a preparation method thereof.

BACKGROUND

Conventional elastic particles can only be present as loose individual particles. The elastic bulking particles are typically bonded into a fixed shape by molding by hot melting or by adding glue to form a hardening reaction. After the shape is fixed, the particles can no longer be returned to loose particles, and cannot be reused.

SUMMARY

According to various embodiments of the present disclosure, an elastic particle and a preparation method thereof are provided.

An elastic particle is produced from raw materials including, by weight percent, 20% to 55% of styrenic block copolymer, 20% to 77% of softening oil, and 3% to 25% of liquid rubber.

A method of preparing an elastic particle includes:
weighing 20% to 55% by weight of styrenic block copolymer, 20% to 77% by weight of softening oil, and 3% to 25% by weight of liquid rubber; and mixing the styrenic block copolymer, the softening oil, and the liquid rubber at room temperature under continuous stirring to obtain the elastic particle.

An elastic article made of the foregoing elastic particle is also provided.

The above and other features of the invention including various novel details of construction and combinations of parts, and other advantages, will now be more particularly described with reference to the accompanying drawings and pointed out in the claims.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawing:

FIG. 1 is a flowchart of a method of preparing an elastic particle according to an embodiment.

DETAILED DESCRIPTION OF THE EMBODIMENTS

The above objects, features and advantages of the present invention will become more apparent by describing in detail embodiments thereof with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An elastic particle according to an embodiment can be adhered together subjected to external force, and can be automatically loosened after the external force is removed. The raw materials for preparing the elastic particle include: by weight percent, 20% to 55% of styrenic block copolymer, 20% to 77% of softening oil, and 3% to 25% of liquid rubber. The aforementioned elastic particle is obtained by mixing the raw materials of the elastic particle at room temperature. It should be noted that the room temperature referred herein refers to $-10°$ C. to $40°$ C.

Styrenic block copolymers (SBCs) are thermoplastic elastomers. Specifically, the styrenic block copolymer is at least one selected from the group consisting of styrene-butadiene-styrene block copolymer (SBS), styrene-isoprene-styrene block copolymer (SIS), styrene-ethylene-butylene-styrene block copolymer (SEBS), styrene-ethylene-propylene-styrene block copolymer (SEPS), and hydrogenated styrene-butadiene-isoprene-styrene block copolymer (SEEPS). In one embodiment, the styrenic block copolymer is SEPS, which has a better tenacity, is softer in material, and has a higher elasticity after absorbing the softening oil and the liquid rubber.

The softening oil is liquid which can be compatible with the styrenic block copolymer at room temperature and can be absorbed by the styrenic block copolymer to soften the styrenic block copolymer. The softening oil can be absorbed by the styrenic block copolymer to produce a swelling effect, thereby expanding the volume of the styrenic block copolymer to form fluffy particles. The hardness of the fluffy styrenic block copolymer is lowered, and the rebound performance is improved.

Specifically, the softening oil is at least one selected from the group consisting of paraffin oil and naphthenic oil. The aforementioned softening oil has a good compatibility with the styrenic block copolymer at room temperature and is relatively easily absorbed by the styrenic block copolymer. In one embodiment, the softening oil is paraffin oil. Paraffin oil is more resistant to sunlight aging than naphthenic oil, which helps to extend the service life of the elastic particle.

The liquid rubber is a flowable rubber which can be compatible with the styrenic block copolymer at room temperature, has a viscosity, and can be absorbed by the styrenic block copolymer. The liquid rubber is viscous itself and enables the styrenic block copolymer to be slightly dissolved. After being absorbed by the styrenic block copolymer, the liquid rubber has a certain adhesiveness, such that the elastic particle has a viscosity.

Specifically, the liquid rubber is at least one selected from the group consisting of diene rubber and polyisobutylene rubber. The aforementioned liquid rubber can be well compatible with the styrenic block copolymer at room temperature and is relatively easily absorbed by the styrenic block copolymer. In one embodiment, the diene rubber is at least one selected from the group consisting of nitrile butadiene rubber, styrene butadiene rubber, butadiene rubber, isoprene rubber, and butyl rubber. In one embodiment, the liquid rubber is at least one of butadiene rubber and isoprene rubber. Such two rubbers are capable of being rapidly absorbed by the styrenic block copolymer at room temperature and have a low degree of dissolving of the styrenic block copolymer.

Moreover, the raw materials for preparing the elastic particle include: by weight percent, 25% to 40% of styrenic block copolymer, 40% to 65% of softening oil, and 10% to 20% of liquid rubber. When the content of the softening oil ranges from 40% to 65%, the swelling of the styrenic block copolymer is more remarkable, which is very advantageous to increase the dispersion speed of the liquid rubber in the styrenic block copolymer. The content of the liquid rubber ranges from 10% to 20%, which is suitable for the dissolving and adhesion strength of the styrenic block copolymer, such that the compression molding and the pressure release loose function of the elastic particles can be well achieved. Due to the high consistency of the liquid rubber, the resistance to penetration into the styrene block copolymer is large. With the aid of the softening oil, the volume of the elastic particles expands, the speed of penetration and dispersion of the liquid rubber becomes faster, and the dispersion is more uniform, which is favorable for forming a stable adhesive force.

In one embodiment, the styrene block copolymer is styrene-ethylene-propylene-styrene block copolymer (SEPS), the softening oil is paraffin oil, and the liquid rubber is at least one selected from the group consisting of butadiene rubber and isoprene rubber. When paraffin oil is in contact with SEPS, the elastic particles expand larger and the swelling effect of SEPS is significantly higher than that in naphthenic oil. In addition, the high-temperature resistance and plasticizing resistance of the formed elastic particles are also significantly higher than those in naphthenic oil, which is advantageous for increasing the upper limit of the use temperature of the elastic particles. The butadiene rubber and the isoprene rubber have a high compatibility with the styrene block copolymer and have a moderate ability to dissolve the styrene block copolymer, and thus are the preferred liquid rubber varieties. Compared with the butadiene rubber and isoprene rubber, the nitrile butadiene rubber has a heavy odor and has a particularly strong ability to dissolve the styrene block copolymer. If the dissolving is too strong, the expanded elastic particles will be dissolved to form a true sol or paste, such that the volume of the elastic particles is reduced and the rebound performance is lowered. The styrene butadiene rubber, butyl rubber, and polyisobutylene rubber have a slow dissolution of the styrene block copolymer, and the processing thereof is more difficult than that of the butadiene rubber and the isoprene rubber.

In one embodiment, the raw materials for preparing the elastic particle consist of: by weight percent, 20% to 55% of styrenic block copolymer, 20% to 77% of softening oil, and 3% to 25% of liquid rubber. In another embodiment, the raw materials for preparing the elastic particle consist of: by weight percent, 25% to 40% of styrenic block copolymer, 40% to 65% of softening oil, and 10% to 20% of liquid rubber.

The aforementioned elastic particles have at least the following advantages:

(1) It has been experimentally proved that the aforementioned elastic particles have a certain viscosity, which enables the elastic particle to be adhered together only by applying a certain external force, without die pressing under hot melting or hardening reaction by glue, and the elastic particle can be automatically loosened and returned to the original state after the external force is removed.

(2) It has also been experimentally found that the aforementioned elastic particles have strong impact resistance. The greater the impact force, the elastic particle forms a strong elastic force in the opposite direction in time, and thus has extremely high shock absorption performance. In addition, the aforementioned elastic particle does not absorb moisture, and thus does not undergo a change in performance due to changes in humidity in the air. The aforementioned elastic particle has excellent low-temperature resistance, and the performance state thereof remains normal at −40° C., and the elastic particle has good weather resistance. The aforementioned elastic particles do not react with water and still exhibit similar performances in water. The aforementioned elastic particles are loose and porous, have good gas permeability, and have excellent thermal insulating ability. The aforementioned elastic particles have good sound absorbing effect and strong sound insulation ability. The materials of preparing the aforementioned elastic particles are all insulating, such that they have good electrical insulation.

Referring to FIG. 1, a method of preparing an elastic particle according to an embodiment includes:

In step S110, 20% to 55% by weight of styrenic block copolymer, 20% to 77% by weight of softening oil, and 3% to 25% by weight of liquid rubber are weighed.

The styrenic block copolymer is in a form of particle or powder. The styrenic block copolymer is at least one selected from the group consisting of styrene-butadiene-styrene block copolymer (SBS), styrene-isoprene-styrene block copolymer (SIS), styrene-ethylene-butylene-styrene block copolymer (SEBS), styrene-ethylene-propylene-styrene block copolymer (SEPS), and hydrogenated styrene-butadiene-isoprene-styrene block copolymer (SEEPS). In one embodiment, the styrene block copolymer is styrene-ethylene-propylene-styrene block copolymer (SEPS).

The softening oil is liquid which can be compatible with the styrenic block copolymer at room temperature and can be absorbed by the styrenic block copolymer to soften the styrenic block copolymer. Specifically, the softening oil is at least one selected from the group consisting of paraffin oil and naphthenic oil. In one embodiment, the softening oil is paraffin oil.

The liquid rubber is a flowable rubber which can be compatible with the styrenic block copolymer at room temperature, has a viscosity, and can be absorbed by the styrenic block copolymer. Specifically, the liquid rubber is at least one selected from the group consisting of diene rubber and polyisobutylene rubber. In one embodiment, the diene rubber is at least one selected from the group consisting of nitrile butadiene rubber, styrene butadiene rubber, butadiene rubber, isoprene rubber, and butyl rubber. In one embodiment, the liquid rubber is at least one of butadiene rubber and isoprene rubber.

Moreover, the raw materials for preparing the elastic particle include: by weight percent, 25% to 40% of styrenic block copolymer, 40% to 65% of softening oil, and 10% to 20% of liquid rubber.

In one embodiment, the raw materials for preparing the elastic particle consist of: by weight percent, 20% to 55% of styrenic block copolymer, 20% to 77% of softening oil, and 3% to 25% of liquid rubber. In another embodiment, the raw materials for preparing the elastic particle consist of: by weight percent, 25% to 40% of styrenic block copolymer, 40% to 65% of softening oil, and 10% to 20% of liquid rubber.

In step S120: the styrenic block copolymer, the softening oil, and the liquid rubber are mixed at room temperature under continuous stirring to obtain the elastic particle.

In one embodiment, the step S120 includes: the softening oil and the liquid rubber are uniformly mixed under room temperature and continuous stirring, and then the styrenic block copolymer is added to continuously mix for 15 min to 60 min, such that the softening oil and the liquid rubber are absorbed by the styrenic block copolymer. At this time, the surface of the styrenic block copolymer has no oil stains.

In another embodiment, the step S120 includes: the softening oil and the styrenic block copolymer are mixed for 15 min to 60 min under room temperature and continuous stirring, and then the liquid rubber is added to continuously mix for 15 min to 60 min.

In yet another embodiment, the step S120 includes: the liquid rubber and the styrenic block copolymer are mixed for 15 min to 60 min under room temperature and continuous stirring, and then the softening oil is added to continuously mix for 15 min to 60 min.

The aforementioned method of preparing the elastic particle has the advantages of simple operation, no heating, a low energy consumption, and is easy for industrial production. The prepared elastic particles have a certain viscosity, which enables the elastic particle to be adhered together only by applying a certain external force without die pressing under hot melting or glue curing reaction, and the elastic particle can be automatically loosened and returned to the original state after the external force is removed.

The aforementioned elastic particles can be applied to an elastic article, such as a pillow, a pad, waterproof membrane, insulating clothing, insulating sleeves, wrappage, thermal insulating coats, artificial snow, and toys.

In one embodiment, the elastic particles can be used as a filler for the pillow.

In one embodiment, the elastic particles can be used as a filler for the pad. The pad can be a seat cushion, a mattress or a floor mat, for example, a floor mat of a sports ground, a seat cushion of a household commodity, which can serve as a cushioning function.

In one embodiment, the elastic particles can be used as a filler for the toy, thereby obtaining a new type of granular texture of the new game of toys. The elastic particles can be pressed into different shapes and automatically loosened, such that the repetitive shape can be repeated, which is more interesting for children.

In one embodiment, the elastic particles can be used as a water blocking material in the waterproof membrane, which is a lightweight particle for waterproofing and leakage prevention.

In one embodiment, the elastic particles can be used as a filler for the insulating clothing and the insulation sleeve, and can be incorporated into a handle of an electric appliance as an insulating material.

In one embodiment, the elastic particles can be used as a filling layer for the wrappage. In addition, the elastic particles can be used as an interlayer of a boxing glove.

In one embodiment, the elastic particles can be used as a filling material for the thermal insulating coat, which is suitable for snow sports and is particularly suitable for a cold environment.

In one embodiment, the elastic particles can be used as a sound absorbing and sound insulating material, and can be used as a decorative material for a karaoke wall to provide a noise prevention and soundproof effect.

In one embodiment, the elastic particles can be used as an artificial snow material in a playground, which is resistant to both falling and slipping, and also provides an artistic conception.

The following are specific examples (unless otherwise specified, the following examples do not contain other unspecified components other than unavoidable impurities):

EXAMPLE 1

A process of preparing an elastic particle of the present embodiment is described as follows:

(1) Each component was weighed in accordance with Table 1 to obtain the raw materials. The content in Table 1 represented a weight percentage of each of the components.

(2) The softening oil and the liquid rubber were uniformly mixed under room temperature and continuous stirring, and then the styrenic block copolymer was added to continuously mix for 35 min.

TABLE 1

| | Styrenic block copolymer | | Softening oil | | Liquid rubber | |
|---|---|---|---|---|---|---|
| | Substance | Content (%) | Substance | Content (%) | Substance | Content (%) |
| Example 1 | SBS | 51 | paraffin oil | 37 | polyisobutylene rubber | 12 |
| Example 2 | SIS | 40 | naphthenic oil | 40 | isoprene rubber | 20 |
| Example 3 | SEBS and SEPS in a mass ratio of 22:10 | 32 | paraffin oil and naphthenic oil in a mass ratio of 26:30 | 56 | nitrile butadiene rubber | 12 |
| Example 4 | SBS and SEEPS in a mass ratio of 13:17 | 30 | paraffin oil | 60 | butadiene rubber and isoprene rubber in a mass ratio of 3:7 | 10 |
| Example 5 | SEBS | 25 | naphthenic oil | 65 | butadiene rubber | 10 |
| Example 6 | SEEPS | 20 | naphthenic oil | 77 | butyl rubber | 3 |

TABLE 1-continued

|  | Styrenic block copolymer | | Softening oil | | Liquid rubber | |
| --- | --- | --- | --- | --- | --- | --- |
|  | Substance | Content (%) | Substance | Content (%) | Substance | Content (%) |
| Example 7 | SEPS | 55 | paraffin oil | 20 | styrene butadiene rubber | 25 |
| Example 8 | SEPS | 30 | paraffin oil | 55 | butadiene rubber | 15 |
| Example 9 | SEPS | 25 | paraffin oil | 65 | isoprene rubber | 10 |
| Example 10 | SEPS | 40 | paraffin oil | 40 | isoprene rubber | 20 |
| Example 11 | SEPS | 35 | paraffin oil | 47 | butadiene rubber and isoprene rubber in a mass ratio of 1:1 | 18 |
| Comparative Example 1 | SEPS | 60 | paraffin oil | 15 | styrene butadiene rubber | 25 |
| Comparative Example 2 | SEEPS | 15 | naphthenic oil | 82 | butyl rubber | 3 |
| Comparative Example 3 | SEPS | 55 | paraffin oil | 15 | styrene butadiene rubber | 30 |

EXAMPLE 2

A process of preparing an elastic particle of the present embodiment is described as follows:

(1) Each component was weighed in accordance with Table 1 to obtain the raw materials. The content in Table 1 represented a weight percentage of each of the components.

(2) The softening oil and the liquid rubber were uniformly mixed under room temperature and continuous stirring, and then the styrenic block copolymer was added to continuously mix for 60 min.

EXAMPLE 3

A process of preparing an elastic particle of the present embodiment is described as follows:

(1) Each component was weighed in accordance with Table 1 to obtain the raw materials. The content in Table 1 represented a weight percentage of each of the components.

(2) The softening oil and the styrenic block copolymer were mixed for 20 min under room temperature and continuous stirring, and then the liquid rubber was added to continuously mix for 25 min.

EXAMPLE 4

A process of preparing an elastic particle of the present embodiment is described as follows:

(1) Each component was weighed in accordance with Table 1 to obtain the raw materials. The content in Table 1 represented a weight percentage of each of the components.

(2) The softening oil and the styrenic block copolymer were mixed for 30 min under room temperature and continuous stirring, and then the liquid rubber was added to continuously mix for 30 min.

EXAMPLE 5

A process of preparing an elastic particle of the present embodiment is described as follows:

(1) Each component was weighed in accordance with Table 1 to obtain the raw materials. The content in Table 1 represented a weight percentage of each of the components.

(2) The liquid rubber and the styrenic block copolymer were mixed for 30 min under room temperature and continuous stirring, and then the softening oil was added to continuously mix for 15 min.

EXAMPLE 6

A process of preparing an elastic particle of the present embodiment is described as follows:

(1) Each component was weighed in accordance with Table 1 to obtain the raw materials. The content in Table 1 represented a weight percentage of each of the components.

(2) The liquid rubber and the styrenic block copolymer were mixed for 15 min under room temperature and continuous stirring, and then the softening oil was added to continuously mix for 60 min.

EXAMPLE 7

A process of preparing an elastic particle of the present embodiment is described as follows:

(1) Each component was weighed in accordance with Table 1 to obtain the raw materials. The content in Table 1 represented a weight percentage of each of the components.

(2) The liquid rubber and the styrenic block copolymer were mixed for 60 min under room temperature and continuous stirring, and then the softening oil was added to continuously mix for 30 min.

EXAMPLE 8

A process of preparing an elastic particle of the present embodiment is described as follows:

(1) Each component was weighed in accordance with Table 1 to obtain the raw materials. The content in Table 1 represented a weight percentage of each of the components.

(2) The softening oil and the liquid rubber were uniformly mixed under room temperature and continuous stirring, and then the styrenic block copolymer was added to continuously mix for 15 min.

EXAMPLE 9

A process of preparing an elastic particle of the present embodiment is described as follows:

(1) Each component was weighed in accordance with Table 1 to obtain the raw materials. The content in Table 1 represented a weight percentage of each of the components.

(2) The softening oil and the styrenic block copolymer were mixed for 15 min under room temperature and continuous stirring, and then the liquid rubber was added to continuously mix for 60 min.

EXAMPLE 10

A process of preparing an elastic particle of the present embodiment is described as follows:

(1) Each component was weighed in accordance with Table 1 to obtain the raw materials. The content in Table 1 represented a weight percentage of each of the components.

(2) The softening oil and the styrenic block copolymer were mixed for 60 min under room temperature and continuous stirring, and then the liquid rubber was added to continuously mix for 15 min.

EXAMPLE 11

A process of preparing an elastic particle of the present embodiment is described as follows:

(1) Each component was weighed in accordance with Table 1 to obtain the raw materials. The content in Table 1 represented a weight percentage of each of the components.

(2) The softening oil and the styrenic block copolymer were mixed for 25 min under room temperature and continuous stirring, and then the liquid rubber was added to continuously mix for 30 min.

COMPARATIVE EXAMPLES 1 to 3

The preparation process of the elastic particles of Comparative Examples 1 to 3 was substantially the same as that of Example 5. The difference was the respective components and the weight percentages thereof. The components and their weight percentages of the elastic particles of Comparative Examples 1 to 3 were shown in Table 1.

Test:

(1) Hardness test: Since the test methods such as the conventional need punching, indentation or crushing methods were difficult to achieve the hardness test of such a single elastic particle, the following test was carried out by stacking the elastic particles together to reflect the hardness of the elastic particles by the hardness of the deposit of the elastic particles. In other words, the hardness of the deposit of the elastic particles obtained by the test was directly used as the hardness of the elastic particles in Table 2. The specific test method was as follows:

The hardness of the deposits of the elastic particles obtained by stacking the elastic particles of Examples 1 to 11 and Comparative Examples 1 to 3 was respectively tested by using the LX-F type sponge Shore hardness tester. The sponge hardness tester differs from other hardness testers in the measurement use, and the contact end between the sponge hardness tester and the test object is a bottom plane of a cylinder rather than a needle shape. The bottom plane of the cylinder served as a presser foot. During use, the presser foot was directly in contact with the sample and was used as the load using its own weight. Usage: The elastic particles were placed on a flat glass. A stacking thickness was greater than or equal to 5 cm, and a length and a width were greater than or equal to 30 cm. The surface was smoothed, and the hardness tester was gently placed on the flat particles by holding a middle part of the instrument. The reading was taken within 1 second after the presser foot of the hardness tester was in smooth contact with the particles. At this time, the scale indicated by the pointer was used to simulate the hardness value of the deposit of the elastic particles, and the data was represented by 0~100. When the presser foot of the hardness tester was in a free state, the scale indicated by the pointer was "0". When an end surface of a pressing was in close contact with a plane of the presser foot on the glass plate, the scale indicated by the pointer should be "100". The hardness of the elastic particles of Examples 1 to 11 and Comparative Examples 1 to 3 was shown in Table 2. Generally, the soft sponge is suitable for filling pillows or toys, and the hard sponge is suitable for a mat. For example, the hardness of EVA (ethylene-vinyl acetate copolymer) foam sponge is relatively high, generally 60~80, and suitable for floor mats. The hardness of PP (Polypropylene) foam pearl cotton deposit is relatively low, generally 5~15, which is mostly used for pillow filling. The hardness of the sponge of the sofa cushion is generally 50~60, and the hardness of the sponge of the sofa backrest is generally 20~30. The elastic particles correspond to the soft sponges, and the hardness of 5 to 30 can be defined as a kind of soft sponge with wide application. Therefore, the hardness of the elastic particles is preferably between 5 and 30.

(2) Elasticity test: Elasticity is the property of the elastic particles to return to the original state after the external force is removed. The elasticity of the elastic particles is also reflected here by the elasticity of the deposit of the elastic particles. Specifically, after the release of the pressure having a constant value, the time during which the elastic particle deposits recovered to approximately 80% of the original volume is recorded. The test method is specifically as follows:

100.00 g of the elastic particles were weighed, and dispersedly placed in a cylindrical cylinder having a smooth inner wall with a diameter of 100 mm. After filling the elastic particles, the cylindrical cylinder was gently shaken and then allowed to stand for 20 min to simulate a natural accumulation state. A mark was marked on the stacking height line. A standard weight of 2000 g with a diameter of 98 mm was then put into the cylindrical cylinder, and squeezed the elastic particles for 90 s. Then, the standard weight was taken out and the timing was started to record the time for returning to 80% of the original height, thereby recording the time as an indicator of elasticity. The shorter the time, the better the elasticity. The longer the time, the worse the elasticity. The time for returning to 80% of the original height of the elastic particles of Examples 1 to 11 and Comparative Examples 1 to 3 was obtained in seconds, as shown in Table 2.

(3) Adhesive property test: The adhesive force between the elastic particles is temporarily not available in standard test methods, since the elastic particles are bonded into a whole by external force, and then will be gradually loosened, which is applied no matter how much pressure. The greater the adhesive force, the longer the looseness time, and the less the adhesive force, the shorter the looseness time. Taking the time beginning to loosen as the performance indicator of the adhesive force, the specific test method is as follows:

100.00 g of the elastic particles were weighed, and dispersedly placed in a cylindrical cylinder having a smooth inner wall with a diameter of 100 mm. A standard weight of 2000 g with a diameter of 98 mm was then put into the cylindrical cylinder, and squeezed the elastic particles for 300 s. A mark line was marked at 10 mm above the bottom of the weight on the cylinder. Then, the standard weight was taken out, and the time in which the surface of the elastic particles was changed from flat to curved just up to the 10 mm mark line was observed in seconds. The time in which the elastic particles of Examples 1 to 11 and Comparative Examples 1 to 3 were raised to the 10 mm mark line were obtained, as shown in Table 2.

(4) Bulkiness test: The bulkiness of the elastic particles is expressed by a ratio between the compaction density and the bulk density of the elastic particles deposit. Generally, the density of the moderately foamed sponge is 0.2 g/cm$^3$ to 0.45 g/cm$^3$, and the compaction density thereof is 0.6 g/cm$^3$ to 0.9 g/cm$^3$, and the degree of expansion of the moderately foamed sponge is a ratio between the compaction density and the density, which is 2~3. The deposit of elastic particles is equivalent to the moderately foamed sponge. In other words, the degree of expansion of the elastic particles is substantially between 2 and 3.

Bulk density test method: a cylindrical cylinder having a diameter of 100 mm and a height of 300 mm was prepared. The elastic particles were slowly poured into the cylindrical cylinder from the top thereof, and the cylinder was shaken left and right during the pouring process, until the elastic particles just reach the 100 mm mark line.

Compaction density test method: 2000 g of a weight having a diameter of 98 mm was placed in the elastic particles used in the aforementioned bulk density test. The elastic particles were pressed for 60 s. After the weight moves downwardly to the standstill, the scale line h where the weight is located was recorded.

Then, a ratio between the height of the elastic particles before compression to the height of the elastic particles after compression can be taken as the bulkiness of the elastic particles, that is, the bulkiness is 100:h. The greater the ratio between the two densities, the greater the bulkiness. The less the ratio between the two densities, the less the bulkiness. The bulkiness of the elastic particles of Examples 1 to 11 and Comparative Examples 1 to 3 was tested by the ratio between the bulk density and the compaction density, and the results were shown in Table 2.

The hardness, elasticity, adhesive property, and bulkiness of the elastic particles of Examples 1 to 11 and Examples 1 to 3 were shown in Table 2.

TABLE 2

| | Hardness | Elasticity (s) | Adhesive property (s) | Bulkiness |
|---|---|---|---|---|
| Example 1 | 29 | 6200 | 21 | 1.8 |
| Example 2 | 26 | 6700 | 43 | 1.7 |
| Example 3 | 14 | 2700 | 31 | 2.1 |
| Example 4 | 15 | 7100 | 24 | 2.6 |
| Example 5 | 8 | 3200 | 29 | 2.2 |
| Example 6 | 9 | 7600 | 38 | 2.8 |
| Example 7 | 30 | 7300 | 55 | 1.6 |
| Example 8 | 14 | 4800 | 21 | 2.7 |
| Example 9 | 5 | 4300 | 20 | 2.9 |
| Example 10 | 16 | 4700 | 28 | 2.2 |
| Example 11 | 12 | 4600 | 26 | 2.5 |
| Comparative Example 1 | 44 | 8100 | 74 | 1.1 |
| Comparative Example 2 | 3 | 9100 | 92 | 1 |
| Comparative Example 3 | 42 | 8200 | 85 | 1.1 |

As can be seen from Table 1, the hardness of the elastic particles of Examples 1 to 11 was 5 to 30, the time for returning to 80% of the original height was 2700 s to 7600 s, the time to rise to the 10 mm mark line was 18 s to 55 s, and the bulkiness was 1.7 to 2.9, which had suitable hardness, good elasticity, suitable adhesive properties, and ideal bulkiness. In addition, the elastic particles of Examples 8 to 11 had more suitable elasticity, adhesive properties, and bulkiness. The time for returning to 80% of the original height of the elastic particles of Comparative Examples 1 to 3 was at least 8100 s, the rebound speed was relatively slow, and the elasticity was poor. If the elastic particles are too hard or too soft, the bulkiness will be too low, or even no bulkiness, and the corresponding adhesive properties and rebound properties will change significantly, such that the elastic particles lose their application value.

(5) Shock absorption performance test: The shock absorption performance test referred to the drop hammer impact method of the performance of the ASTM F1976-06 cushioning sports sole. The elastic particles were placed in a disc having a diameter of 100 mm, and a thickness of the elastic particles was 35 mm. A hammer having a cylindrical diameter of 45 mm and a weight of 8.5 kg was used to impact for 30 times with an impact interval of 5 s, and an impact energy was set at 5 J. The descending height of the elastic particles was recorded in mm, and the descending height was equal to the height at the starting position minus the height of the position after descent.

(6) Moisture resistance test: The moisture resistance of the elastic particles was tested according to GB/T2423.4-2008 alternating heat and humidity test. The test method is specifically as follows: the elastic particles were placed in a test chamber at a temperature of 25° C. and a humidity of 95%. The test chamber was heated to 55° C. within 3 hours, and the humidity was greater than or equal to 95%, and maintained for 12 hours. The test chamber was then cooled to 25° C. within 6 hours, the humidity was greater than or equal to 95%, and maintained for another 12 hours. This was repeated once more. The elastic particles after the test were then taken out, and the difference in performance between the tested elastic particles and the untested elastic particles was compared.

(7) Low-temperature resistance test: The minimum temperature at which the elastic particles did not exhibit brittle failure when subjected to an impact was tested according to ISO 812: 2017 vulcanized rubber or thermoplastic rubber low-temperature brittle temperature test method. The standard rubber sample for the test had a strip shape, and the impact head impacted the rubber test sample at a rate of 2 m/s to test the minimum temperature at which brittleness did not occur. Therefore, the elastic particles were placed in a vulcanized film (latex balloon) of natural rubber to simulate a strip shape sample subjected to an impact test, thereby testing the case where the elastic particles were brittle at −40° C.

(8) Thermal insulation capacity test: The thermal insulation capacity was tested according to GB/T11048-2008 test method of thermal resistance and wet resistance under the condition of stable physiological comfort of textiles, and the thermal insulation capacity was expressed by thermal resistance. The elastic particles were covered on a test plate, and under static air conditions, the test plate and the periphery were kept at 35° C., and the thermal resistance Rct of the elastic particles was tested in units of square meter Kelvin per watt (m$^2$·k/w). The greater the thermal resistance, the better the thermal insulation performance.

(9) Sound absorption effect test: According to the detection and evaluation of textile sound absorption performance of GB/T33620-2017, the elastic particles were loaded into one end of an impedance tube, and the other end of the impedance tube was a random noise source. The sound wave passed through the surface of the elastic particles, and the performance of sound energy attenuation was characterized by the sound absorption coefficient. The sound absorption coefficient was between 0 and 1, and the sound absorption material has a sound absorption coefficient greater than 0.2.

(10) Insulation performance test: The insulation performance was tested according to GB/T1692-2008 vulcanized rubber insulation resistivity test. The resistivity was calculated by applying a DC voltage to the elastic particles and testing the leakage current. Since the vulcanized rubber test sample was in a form of block, tube or rod, the test sample of the elastic particles was changed to compact the elastic particles in a glass tube with a length of 100 mm, and the test was carried out by simulation. The greater the resistivity, the better the insulation performance. The insulator had a resistivity greater than $1 \times 10^9$.

The descending height, moisture absorption performance, low-temperature of −40° C. resistance, thermal resistance, sound absorption coefficient, and resistivity of the elastic particles of Examples 1 to 11 and Comparative Examples 1 to 3 were shown in Table 3.

As can be seen from Table 3, the elastic particles of Examples 1 to 11 have a descending height of 28 mm to 45 mm, and have a shock absorbing effect superior to that of Comparative Examples 1 to 3. In addition, it can also be seen from Table 3 that the elastic particles of Examples 1 to 11 also have good moisture absorption performance, low temperature resistance, thermal insulation effect, sound absorption effect, and insulation effect.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the

TABLE 3

| | Descending height (mm) | Moisture absorption performance | Low-temperature of −40° C. resistance | Thermal resistance ($m^2 \cdot k/w$) | Sound absorption coefficient | Resistivity ($\Omega \cdot m$) |
|---|---|---|---|---|---|---|
| Example 1 | 45 | No significant difference | No brittle | 9.0 | 0.58 | $1.1 \times 10^{15}$ |
| Example 2 | 42 | No significant difference | No brittle | 10 | 0.56 | $0.9 \times 10^{15}$ |
| Example 3 | 38 | No significant difference | No brittle | 10.5 | 0.53 | $1.6 \times 10^{15}$ |
| Example 4 | 30 | No significant difference | No brittle | 9.0 | 0.52 | $1.2 \times 10^{15}$ |
| Example 5 | 28 | No significant difference | No brittle | 9.5 | 0.47 | $0.7 \times 10^{15}$ |
| Example 6 | 28 | No significant difference | No brittle | 9.0 | 0.57 | $0.6 \times 10^{15}$ |
| Example 7 | 45 | No significant difference | No brittle | 11 | 0.58 | $1.5 \times 10^{15}$ |
| Example 8 | 30 | No significant difference | No brittle | 10.5 | 0.54 | $0.8 \times 10^{15}$ |
| Example 9 | 28 | No significant difference | No brittle | 10 | 0.51 | $0.9 \times 10^{15}$ |
| Example 10 | 35 | No significant difference | No brittle | 11 | 0.53 | $1.2 \times 10^{15}$ |
| Example 11 | 30 | No significant difference | No brittle | 10.5 | 0.49 | $1.1 \times 10^{15}$ |
| Comparative Example 1 | 57 | No significant difference | No brittle | 9.5 | 0.53 | $1.6 \times 10^{15}$ |
| Comparative Example 2 | 52 | No significant difference | No brittle | 9.0 | 0.41 | $0.8 \times 10^{15}$ |
| Comparative Example 3 | 60 | No significant difference | No brittle | 10 | 0.48 | $1.2 \times 10^{15}$ |

What is claimed is:

1. An elastic particle, wherein the elastic particle is produced from raw materials comprising: by weight percent, 25% to 40% of styrenic block copolymer, 40% to 65% of softening oil, and 10% to 20% of liquid rubber.

2. The elastic particle of claim 1, wherein the styrenic block copolymer is at least one selected from the group consisting of SBS, SIS, SEBS, SEPS, and SEEPS.

3. The elastic particle of claim 1, wherein the softening oil is at least one selected from the group consisting of paraffin oil and naphthenic oil.

4. The elastic particle of claim 1, wherein the liquid rubber is at least one selected from the group consisting of diene rubber and polyisobutylene rubber.

5. The elastic particle of claim 4, wherein the diene rubber is at least one selected from the group consisting of nitrile butadiene rubber, styrene butadiene rubber, butadiene rubber, isoprene rubber, and butyl rubber.

6. A method of preparing an elastic particle, comprising:
weighing 25% to 40% by weight of styrenic block copolymer, 40% to 65% by weight of softening oil, and 10% to 20% by weight of liquid rubber; and
mixing the styrenic block copolymer, the softening oil, and the liquid rubber at room temperature under continuous stirring to obtain the elastic particle.

7. The method of claim 6, wherein the mixing the styrenic block copolymer, the softening oil, and the liquid rubber at room temperature under continuous stirring comprises: mixing the softening oil and the liquid rubber uniformly under room temperature and continuous stirring, and then adding the styrenic block copolymer to continuously mix for about 15 min to about 60 min.

8. The method of claim 6, wherein the mixing the styrenic block copolymer, the softening oil, and the liquid rubber at room temperature under continuous stirring comprises: mixing the softening oil and the styrenic block copolymer for about 15 min to about 60 min under room temperature and continuous stirring, and then adding the liquid rubber to continuously mix for about 15 min to about 60 min.

9. The method of claim 6, wherein the mixing the styrenic block copolymer, the softening oil, and the liquid rubber at room temperature under continuous stirring comprises:
mixing the liquid rubber and the styrenic block copolymer for about 15 min to about 60 min under room temperature and continuous stirring, and then adding the softening oil to continuously mix for about 15 min to about 60 min.

10. The method of claim 6, wherein the styrenic block copolymer is at least one selected from the group consisting of SBS, SIS, SEBS, SEPS, and SEEPS.

11. The method of claim 6, wherein the softening oil is at least one selected from the group consisting of paraffin oil and naphthenic oil.

12. The method of claim 6, wherein the liquid rubber is at least one selected from the group consisting of diene rubber and polyisobutylene rubber.

13. The method of claim 12, wherein the diene rubber is at least one selected from the group consisting of nitrile butadiene rubber, styrene butadiene rubber, butadiene rubber, isoprene rubber, and butyl rubber.

14. An elastic article, comprising the elastic particle of claim 1.

15. The elastic article of claim 14, wherein the elastic article is selected from the group consisting of pillow, pad, waterproof membrane, insulating clothing, insulating sleeve, wrappage, thermal insulating coat, artificial snow, and toy.

* * * * *